A. LENTATZ.
TOOL HOLDER FOR GRINDING THREAD CUTTING TOOLS.
APPLICATION FILED MAY 14, 1918.
1,308,430.
Patented July 1, 1919.
2 SHEETS—SHEET 1.
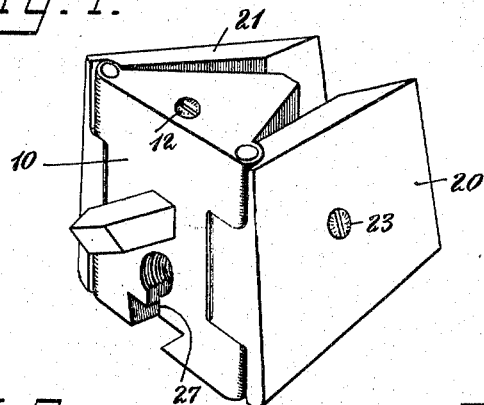
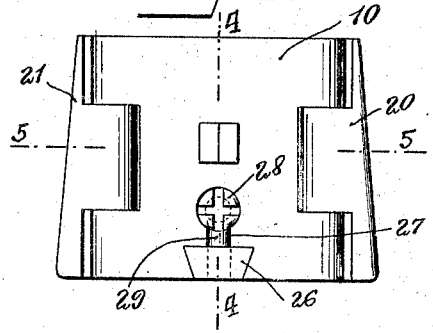
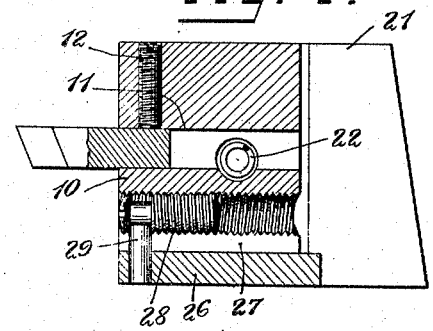
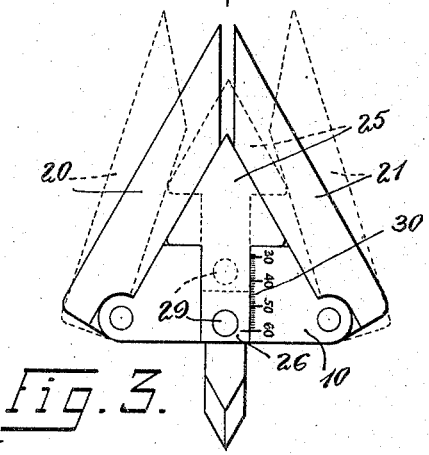
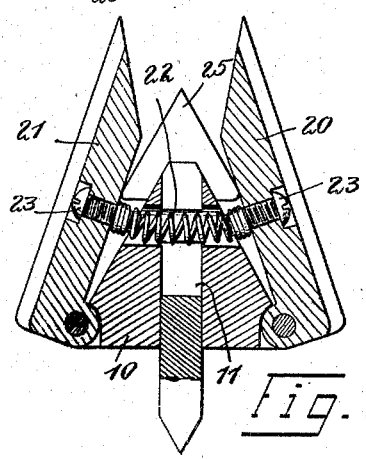
Witnesses:
Charles A. Mathie
Lillian R. Fox.
Inventor
Ambrose Lentatz
By Arthur L. Kent
his Attys.

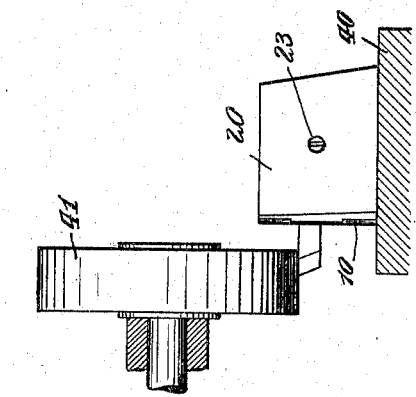
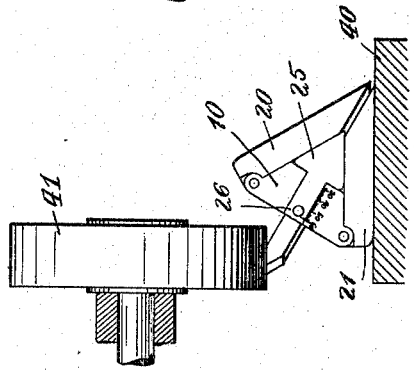
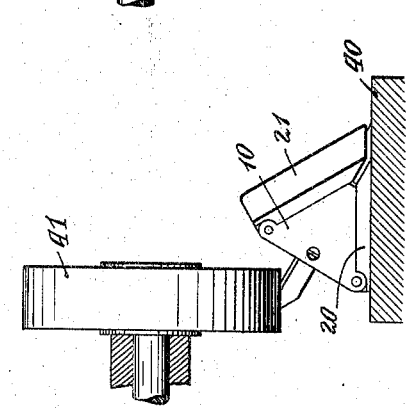

UNITED STATES PATENT OFFICE.

AMBROSE LENTATZ, OF WEST HOBOKEN, NEW JERSEY.

TOOL-HOLDER FOR GRINDING THREAD-CUTTING TOOLS.

1,308,430.  Specification of Letters Patent.  Patented July 1, 1919.

Application filed May 14, 1918. Serial No. 234,412.

*To all whom it may concern:*

Be it known that I, AMBROSE LENTATZ, a citizen of Italy, residing at West Hoboken, in the county of Hudson and State of New Jersey, have invented certain new and useful Improvements in Tool-Holders for Grinding Thread-Cutting Tools, fully described and represented in the following specification and the accompanying drawings, forming a part of the same.

This invention relates to a tool holder for holding cutting tools, and more particularly thread cutting tools, and presenting the same to a grinding wheel. Thread cutting tools are commonly formed from short steel bars or rods fashioned at one end with beveled or inclined side faces and a top face meeting to form a cutting point and adjacent cutting edges. The angle between the beveled faces measured in a plane parallel to the top face must gage accurately to a desired angle, and this angle varies according to the character of the thread to be cut.

The object of the present invention is to provide a device or holder for presenting the tool to the grinding surface in position for causing the inclined side faces and the top face to be ground thereon at the proper relative angles, which shall be adjustable for varying the angle between the inclined side faces of the tool and which may be set by scale for securing the desired angle between such faces. A full understanding of the invention can best be given by a detail description of an embodiment of the invention in an approved form, and such a description will now be given in connection with the accompanying drawings; in which:

Figure 1 is a perspective view of a tool holder made in accordance with my invention;

Fig. 2 is a front view of the holder;

Fig. 3 is a bottom plan view of the holder with the wing plates shown in their extreme closed-in position;

Fig. 4 is a section taken on line 4—4 of Fig. 2;

Fig. 5 is a horizontal section taken on line 5—5 of Fig. 2, the adjustment of the wing plates being as shown in Fig. 1; and Figs. 6, 7 and 8 are views illustrating the use of the device.

Referring to the drawings, and first to Figs. 1 to 5, the tool holder, the parts of which will usually be made of steel or other suitable metal, comprises a body 10 which may be formed from a solid block of metal and will usually be formed with a front face and a bottom face extending at right angles to each other and with its sides inclined inwardly so that the body shall be substantially triangular in horizontal cross-section. The body is formed with a tool-receiving opening 11 extending inward from its front face of a size to receive the rear end portion of the largest size tool for which the holder is to be used, and a set screw 12 is provided in a threaded opening extending downward through the body 10 from the upper face thereof to intersect the tool receiving opening 11. For convenience in manufacture, the opening 11 may extend completely through the body as shown.

Pivotally connected to the body 10, one on each side thereof, is a pair of wing plates 20 and 21, the pivotal axes of the plates being located adjacent the opposite front side edges of the body. The wing plates are adapted to fold against the rearwardly extending portion of the body in the position shown by full lines in Fig. 3. When the wing plates are in this extreme closed-in position, their outer faces, which serve as supporting faces for the holder in grinding the inclined side faces on the tool, extend at an included angle measured in a plane parallel to the base of the body equal to the greatest included angle to which the inclined side faces of the cutter are to be ground. The wing plates are under spring tension tending to move the plates inward toward each other and to the position shown in Fig. 3, as by means of a coiled spring 22 extending through an opening in the body 10 and connected to the wing plates by having its ends connected to screws 23 extending through the plates. For forcing the plates outwardly against the tension of the spring 22 and for adjusting them to vary the included angle between their outer faces, the holder is provided with adjusting means formed to cause simultaneous equal but opposite movements of the two wing plates. In the device shown a spreading head 25 carried by a stem 26 bears against the wing plates, the stem 26 being fitted to slide in a dove-tail way formed in the body 10 and extending in the direction from the front toward the rear thereof and located for convenience adjacent the lower or base face thereof. Extending through the body adjacent the dove-tail way and parallel thereto and connected thereto by a slot 27, is a threaded opening in which is fitted a screw 28. The stem 26 carries a pin 29 which extends through the slot 27 and into an annular groove formed in the screw 28, so that by turning the screw to cause it to move endwise in its threaded opening the stem 26 and the spreading head 25 may be moved either rearward from the position shown in Fig. 3 to force the wing plates outwardly against the tension of the spring 22, or retracted to permit the wings to move inward toward each other. In Figs. 1 and 5, and by dotted lines in Fig. 3, the wing plates are shown as in a position intermediate their positions of maximum and minimum angularity.

The stem 26 and an adjacent portion of the base face of the body 10 are most desirably provided one with a scale and the other with a position indicating mark, the scale being graduated and marked to indicate the positions to which the spreading head and its stem is to be moved for adjusting the wing plates to various angles. In the particular device shown the wing plates are adjustable between positions of a maximum included angle of 60° and of a minimum included angle of 29°, as indicated by the scale 30 shown in Fig. 3. The bottom edges or faces of the wing plates serve, most desirably in connection with the bottom face of the body 10, for supporting the holder when in upright position for grinding the top face of the tool, and in order that the bottom edges of the wing plates shall be in the same plane in all positions of adjustment of the wing plates the pivotal axes of the plates should extend at right angles to the plane in which the bottom edges of the plates lie.

In order that the side faces ground on the cutting end of the tool shall have the customary slight backward and downward slant, the outer faces of the wing plates are formed in planes which are inclined inwardly in the direction upward from the lower edges, the extent of such inward and upward inclination being usually such that the sum of the angles between the planes of the outer surfaces of the wing plates and their respective pivotal axes shall be approximately 15°.

In the use of the tool holder, a tool to be reground, or a piece of tool stock to be ground, having been placed in the opening 11 of the tool holding body 10, the wing plates 20 and 21 are adjusted by turning the screw 28 until the desired angle between the side faces to be cut on the tool is indicated by the scale 30. The tool holder is then placed resting on one of its wing plates on the bed or supporting plate of the grinding apparatus. Any suitable grinding machine or apparatus may of course be used having a suitable supporting plate or bed and a suitable grinding device and means for causing a suitable relative approaching and receding movement between such parts, and the apparatus might be such that such traversing movement as may be necessary between the tool being ground and the grinding device would be given by hand movement of the tool holder on the supporting plate. Most desirably, however, the tool holder is used in connection with a grinding machine of the well-known form having a magnetic bed which makes a traversing movement relatively to a grinding wheel and having a grinding wheel mounted so as to be movable under hand control toward and away from the bed. The bed 40 and the grinding wheel 41 shown in Figs. 6, 7 and 8 are intended to be parts of such a machine.

The tool holder with the tool to be ground in place therein having been placed resting on one of its wing plates on the bed 40 in position to present the end of the tool beneath the grinding wheel, as shown in Fig. 6 for example, the grinding wheel being then lowered to come into grinding engagement with the tool, and the bed making its traversing movement in a direction at right angles to the axis of rotation of the grinding wheel to move the tool tangentially of the wheel, one of the desired inclined side faces will be ground on the tool. When this grinding has been carried to the desired degree by continued lowering of the grinding wheel, the wheel is raised and the tool holder, without changing the position of the tool therein, turned over to rest on its other wing plate as shown in Fig. 7, and the grinding operation repeated to grind the other inclined side face on the tool. After the inclined side faces have been ground, the holder may be placed base down on the bed 40 and the upper face of the tool ground as shown by Fig. 8. For grinding tools having a beveled or inclined face on only one side, or if the angle of the inclined face on one side only of the tool is to be varied, then, obviously, it would not be necessary to have an adjustable wing or other side supporting member on both sides of the holder.

Figs. 6 and 7 show the tool holder as adjusted with the wing plates in their innermost position for forming the cutting end of the tool with its side faces extending at the greatest angle which the holder is adapted for grinding. Obviously, if the wing plates of the holder are adjusted to extend at a lesser angle to each other, the angle between the side faces formed on the tool will be correspondingly reduced.

The movable bed 40 considered in one way is substantially equivalent to a face-plate having a known relation to the part of the wheel 41 to be used for grinding, for evidently if the table 40 were stationary, grinding could be accomplished by sliding the tool holder 10 upon the face-plate or surface of the bed. Correct grinding would in that case be accomplished because the flat surfaces of the tool holder having a definite relation to the surfaces to be ground are truly and firmly supported by the level surface of the bed. The invention from this point of view consists of a tool holder comprising faces having a definite relation to the tool surfaces to be ground and arranged as further described above, and also, when desirable, adjustable as described, said surfaces being adapted to coöperate with a base or face-plate having a definite relation to the part of a grinding tool to be used for grinding, so that by placing the holder with different ones of its said faces upon the face-plate and moving the holder in the planes so determined with the tool in contact with the grinder, the desired grinding will be correctly performed.

It is to be understood that the invention is not to be limited to the exact construction, formation and arrangement of parts of the holder shown in the drawings, but that it includes changes and modifications thereof within the claims.

What is claimed is:

1. A tool holder, comprising a body, means thereon for holding a tool to be ground, said body carrying on one of its sides a flat surface substantially parallel to the tool axis of said tool holder, and an adjustable member carried by said body and having a surface arranged in an adjustably angular relation to said axis, said surfaces being adapted to support the tool holder firmly and truly upon a plane surface having a known relation to the effective part of a grinding tool.

2. A tool holder, comprising a body, means thereon for holding a tool to be ground, said body carrying on one of its sides a flat surface substantially parallel to the tool axis of said tool holder, and adjustable members carried by said body, each member having an outward surface, said surfaces of said members being arranged in adjustably angular relation to the tool axis of said tool holding means on opposite sides thereof, each of the surfaces herein mentioned being adapted to support the tool holder firmly and truly upon a plane surface having a known relation to the effective part of a grinding tool.

3. A device of the class described, having a plurality of flat exterior surfaces, each adapted to support the device firmly and steadily upon a plane surface located definitely in relation to the effective part of a grinding tool, and comprising tool holding means and means supporting one of said surfaces adjustably to vary its plane-angle in relation to the tool-axis of said holding means.

4. A device of the class described, having a plurality of flat exterior surfaces, each adapted to support the device firmly and steadily upon a plane surface located definitely in relation to the effective part of a grinding tool, and comprising tool holding means and members adjustably connected in relation to the tool holding means, each member supporting one of said surfaces adjustably to vary its plane-angle in relation to the tool-axis of said holding means.

5. A tool holder, comprising a tool holding body, supporting members on opposite sides of the body for supporting the body in position for presenting the tool to a grinder for grinding inclined side faces thereon, and means for adjusting said supporting members to vary the angle at which the tool is presented to the grinder.

6. A tool holder, comprising a tool holding body, a supporting wing pivotally connected to the body adjacent one of its front edges, and means for adjusting the angular position of said wing relatively to the body to vary the angle at which the tool is presented to the grinder when the body is resting on said wing.

7. A tool holder, comprising a tool holding body, a pair of supporting wings pivotally connected to the body one adjacent to each of two opposite front edges thereof and serving to support the body in position for presenting the tool to a grinder for grinding inclined side faces thereon, and means for adjusting the wings to vary the angle between them.

8. A tool holder, comprising a tool holding body, a pair of supporting wings pivotally connected to the body one adjacent to each of two opposite front edges thereof and serving to support the body in position for presenting the tool to a grinder for grinding inclined side faces thereon, and means for adjusting the wings to vary the angle between them, said adjusting means being formed to cause equal and simultaneous movements of the two wings.

9. A tool holder, comprising a tool holding body, a pair of supporting wings pivotally connected to the body one adjacent to each of two opposite front edges thereof and serving to support the body in position for presenting the tool to a grinder for grinding inclined side faces thereon, spring means tending to move said wings toward each other, a spreading head for limiting the movement of said wings toward each other, and means for adjusting said head to vary the angle between the wings.

10. A tool holder, comprising a tool holding body, a pair of supporting wings pivotally connected to the body one adjacent to each of two opposite front edges thereof and serving to support the body in position for presenting the tool to a grinder for grinding inclined side faces thereon, and means for adjusting the wings to vary the angle between them, the pivotal axes of the wings being at right angles to the bottom edges thereof.

11. A tool holder, comprising a tool holding body, a pair of supporting wings pivotally connected to the body one adjacent to each of two opposite front edges thereof and serving to support the body in position for presenting the tool to a grinder for grinding inclined side faces thereon, means for adjusting the wings to vary the angle between them, and a scale marked to indicate the angular adjustment of said wings.

12. A tool holder, comprising a tool holding body, a pair of supporting wings pivotally connected to the body one adjacent to each of two opposite front edges thereof and serving to support the body in position for presenting the tool to a grinder for grinding inclined side faces thereon, and means for adjusting the wings to vary the angle between them, the outer or supporting faces of said wings being inclined upwardly and inwardly.

In testimony whereof I have hereunto set my hand in the presence of two subscribing witnesses.

AMBROSE LENTATZ.

Witnesses:
ETHEL JOHNES,
A. L. KENT.

Copies of this patent may be obtained for five cents each, by addressing the "Commissioner of Patents, Washington, D. C."